Figure 1:
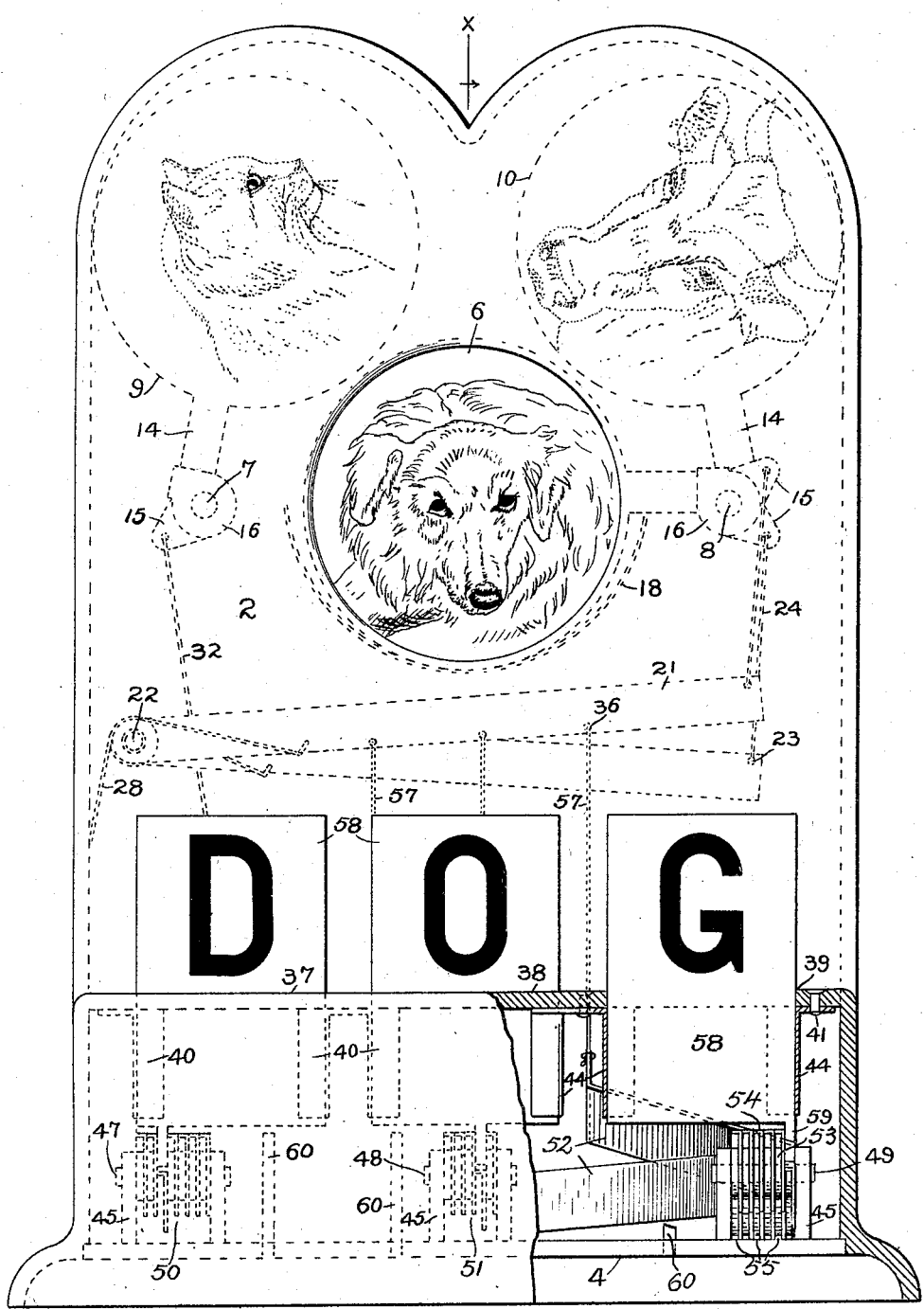

No. 792,801. PATENTED JUNE 20, 1905.
H. H. STEELE.
KINDERGARTEN FOR TEACHING SPELLING.
APPLICATION FILED JULY 31, 1903.

5 SHEETS—SHEET 1.

WITNESSES: INVENTOR
*Fig. 1.* Herbert H. Steele.

No. 792,801. PATENTED JUNE 20, 1905.
H. H. STEELE.
KINDERGARTEN FOR TEACHING SPELLING.
APPLICATION FILED JULY 31, 1903.

5 SHEETS—SHEET 2.

WITNESSES
M. A. Drury.
F. E. Steele

INVENTOR
Herbert H. Steele.

No. 792,801. PATENTED JUNE 20, 1905.
H. H. STEELE.
KINDERGARTEN FOR TEACHING SPELLING.
APPLICATION FILED JULY 31, 1903.
5 SHEETS—SHEET 4.
*Fig. 4.*
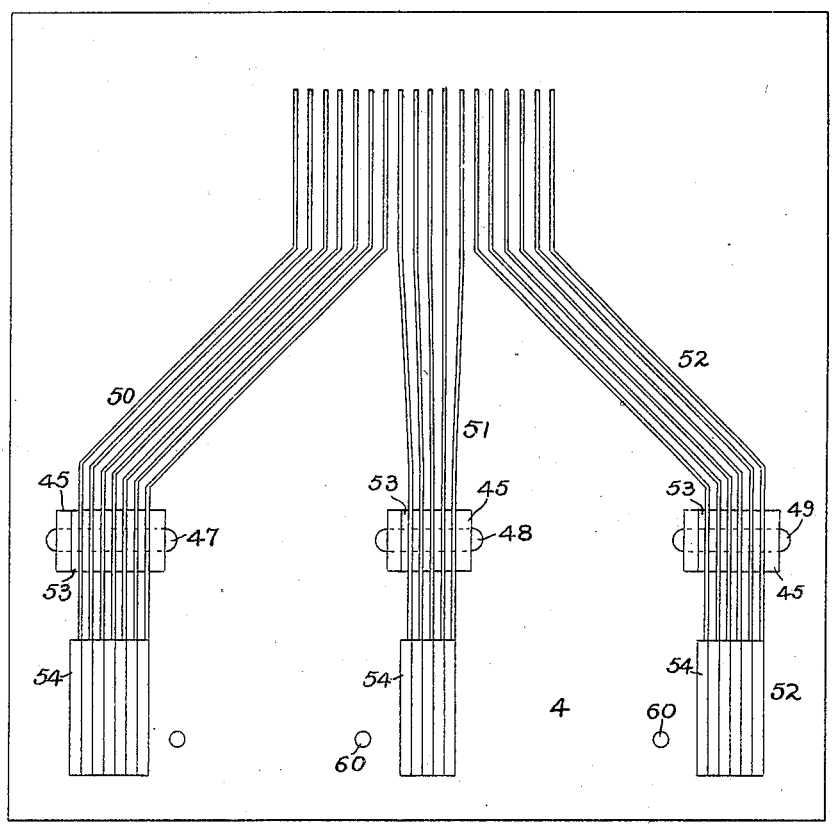
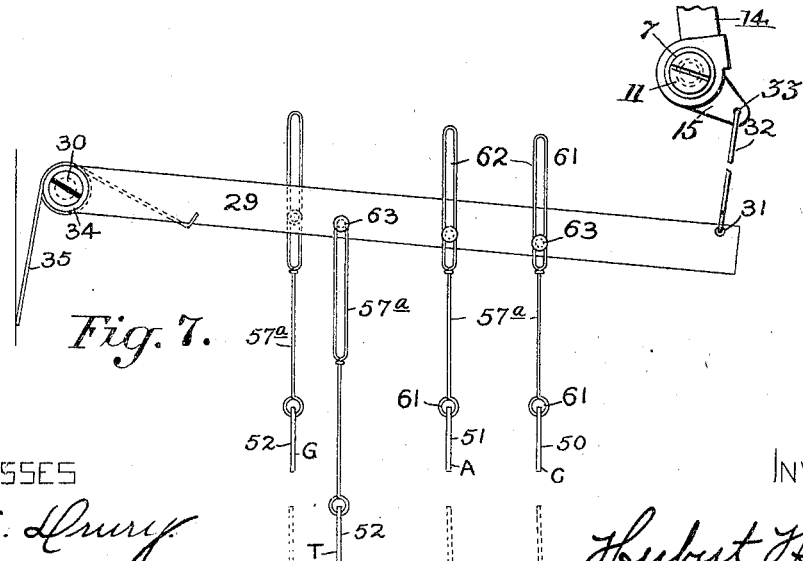
*Fig. 7.*
WITNESSES
INVENTOR No. 792,801. PATENTED JUNE 20, 1905.
H. H. STEELE.
KINDERGARTEN FOR TEACHING SPELLING.
APPLICATION FILED JULY 31, 1903.

5 SHEETS—SHEET 5.

WITNESSES
M. A. Drury.
F. E. Steele

INVENTOR
Hubert H. Steele.

No. 792,801. Patented June 20, 1905.

UNITED STATES PATENT OFFICE.

HERBERT H. STEELE, OF WATERTOWN, NEW YORK.

KINDERGARTEN FOR TEACHING SPELLING.

SPECIFICATION forming part of Letters Patent No. 792,801, dated June 20, 1905.

Application filed July 31, 1903. Serial No. 167,697.

*To all whom it may concern:*

Be it known that I, HERBERT H. STEELE, a citizen of the United States, residing at Watertown, in the county of Jefferson and State of New York, have invented a new and useful Kindergarten for Teaching Spelling, of which the following is a specification.

My invention relates to improvements in kindergarten apparatus in which a series of removable blocks operate to automatically expose a pictured target that is normally hidden from view; and The objects of my invention are, first, to construct a kindergarten apparatus to teach children who are learning their letters to connect the letters with the names of the simple objects they see around them every day; second, to produce a device in which an illustrated target is thrown automatically to register with a central opening through the joint release of a retaining mechanism operated by a series of removable blocks and to automatically disappear when any one of the blocks are removed; third, that all the blocks may interchange with any of a series of openings or slots to the retaining mechanism; fourth, when any two of three blocks (or similar ratio) correctly operate two retaining-levers the third retaining-lever not operated by the third incorrect block will hold the target in its normal position; fifth, that either the blocks or the target may be illustrated with a picture or the letters which spell the picture; sixth, to maintain a uniformity of leverage in the mechanism intermediate the blocks and the targets; seventh, to arrest the insertion of an inverted block to the retaining mechanism, and, eighth, to provide means that the pictures of the objects on each target when thrown to register with the opening may be visible from either the front or rear of the case. These and other objects and advantages of my improvements will hereinafter more fully appear.

To these ends the invention includes features of construction and combinations of devices hereinafter described, and more particularly pointed out in the appended claims.

The preferred form of my invention is illustrated in the accompanying drawings, forming part of this specification, in which—

Figure 2:
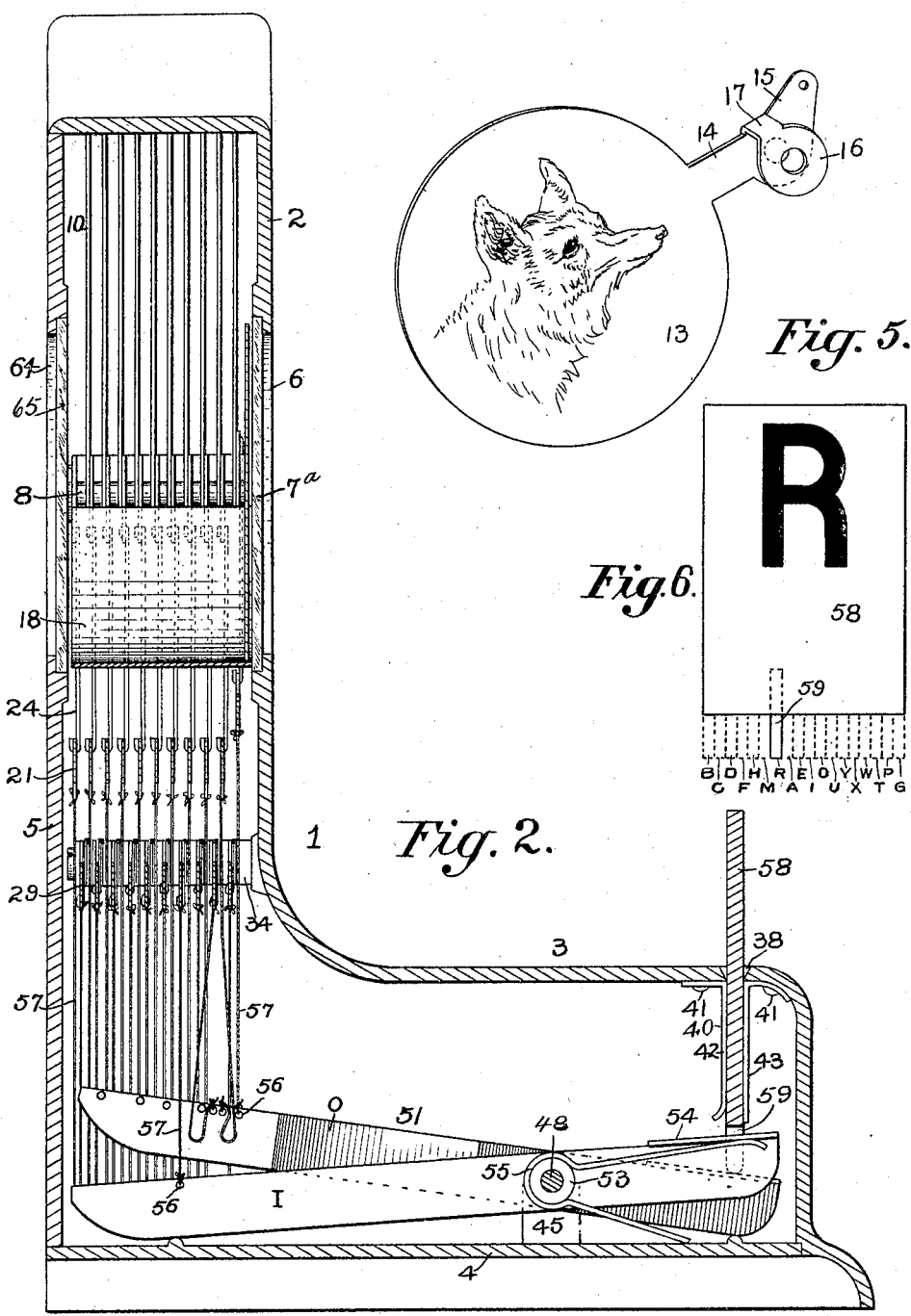
Figure 3:
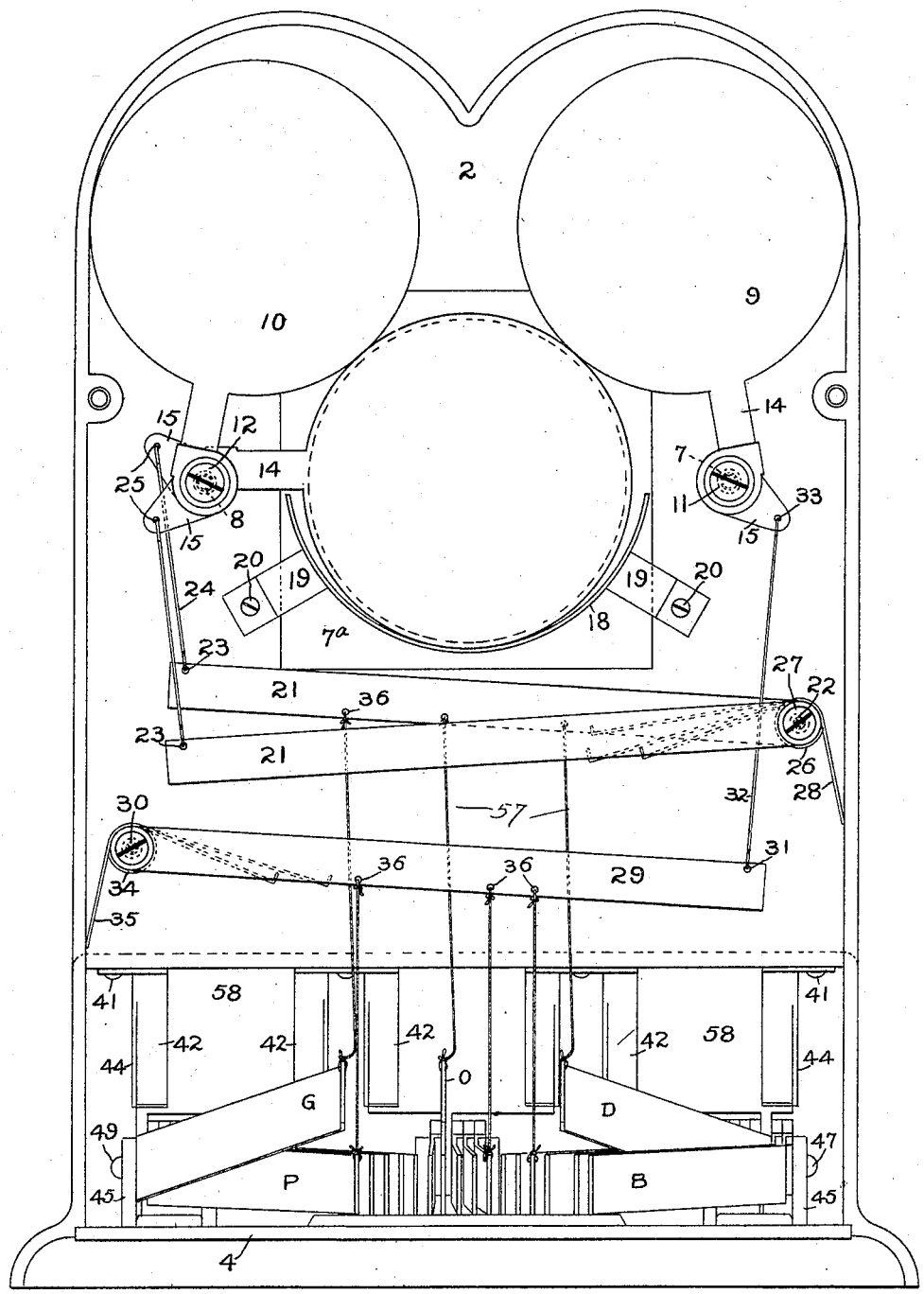
Figure 8:
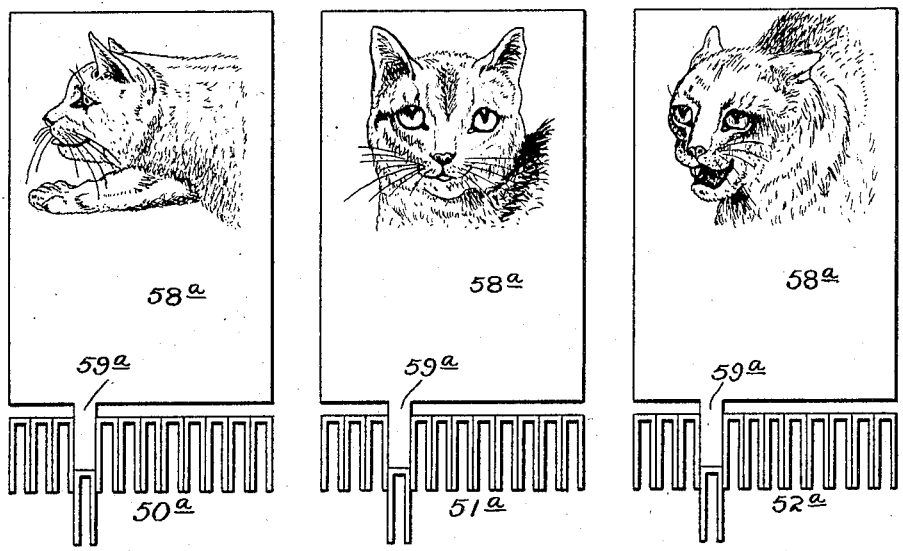

Figure 1 is a front elevation with portions of the casing broken away, showing three blocks "D," "O," and "G" in operative position and the picture of a dog thrown to register with the central opening in the case, also the pictures of a cat and a cow on their respective targets in their normal position behind the casing; Fig. 2, a central vertical section through the case on a plane indicated by the line X X, Fig. 1; Fig. 3, a rear elevation of Fig. 1 with the back plate of the case removed; Fig. 4, a plan view of the base-plate removed from the case to illustrate the relative locations of the retaining-levers; Fig. 5, a view in perspective of one of the pictured targets; Fig. 6, a plan view of the "R" block and illustrating in dotted lines the relative positions of the projecting pin members on the other blocks; Fig. 7, a diagrammatic view to illustrate a modified form of connection between the retaining-levers and the sub-levers; Fig. 8, a modified form of the object, showing the picture of the object in three different attitudes; and Fig. 9, a plan view of a target, having the name of the object, as "C A T," printed thereon and adapted to be used when the modified form of blocks shown in Fig. 8 is employed.

The same character of reference will be used to indicate the same part in the various figures of the drawings.

The casing or frame 1 consists of an upright portion 2 and a horizontal portion 3, that extends forwardly from the upright portion 2 and forms an L-shaped frame to inclose the interior mechanism on the top, front, and two sides. Preferably the bottom plate 4 and the back plate 5 are removably secured to the frame 1 to facilitate the assembling of the various parts within the frame.

The upright portion 2 of the frame is provided with a central opening 6, that may be covered by a suitable glass 7ª, secured to the frame on the inside. On either side of the opening 6 are horizontal pivot-posts 7 and 8, that are rigidly fixed to the frame and serve as axis for two series of illustrated targets 9 and 10, respectively. Each series consists of ten targets all uniform as to size and adapted to swing on their axis radially to the opening 6 and held against end motion as a series by suitable screws 11 and 12, threaded into the free ends of the posts 7 and 8, respectively. The series of targets 9 are arranged to swing to and from the opening 6 midway between the radial paths of the series of targets 10—that is, the first target of the series 9 will pass between the first and second targets of the series 10. This is effected by varying the thickness of the boss (not shown) through which the post 7 is riveted to extend beyond the boss through which the post 8 is fixed to the frame—a distance equal to one-half the space between two adjoining targets.

Figure 9:
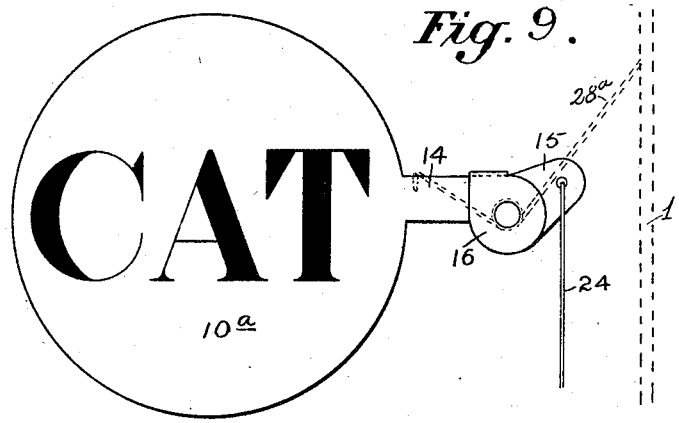

Each target consists of a disk portion 13, an arm 14, and two perforated ears 15 and 16, that are joined by a yoke 17, as shown in Fig. 5, which represents one of the series of targets 10. The targets in the series 9 will be similarly constructed, except that the perforated ear 16 and the yoke 17 will be bent over in the opposite direction to bring said ear on the rear side of the ear 15 in Fig. 5, and the picture or illustration will be on the reverse side of the disk 13 and so form right and left hand targets 10 and 9, respectively. The two ears 15 and 16 give a two-point bearing for the target on its axis to prevent it from wabbling, separates it from the adjoining target, and permits the use of a spring, as shown in Fig. 9, being coiled around the axis between the two ears to assist the movement of the target to or from the opening 6 if practice requires it.

18 is a horizontally-arranged semicircular shelf having two integral ears 19, by which it is suspended to bring the central portion to register with the opening 6, and extends rearwardly to nearly the full depth of the case and held in position by screws 20, that pass through perforations in the ears 19 and threaded into the frame 2. This shelf 18 acts as a stop to arrest the downward movement of each target of either series 9 or 10 and aline them with the opening 6, also to conceal from view through said opening the mechanism underneath. Were this shelf 18 concentric with the opening 6 and the disk 13 of the targets, each target when thrown to the opening would have a circular contact within said shelf equal to its length, and any irregularity in the contour of the disk or any variation in the perforations through the ears 15 or 16 would cause the disk to strike the shelf on either side and so arrest the target before it was properly alined with the opening 6. By arranging the opening 6 eccentric to the radius of the shelf, as shown, the variation of one-sixteenth of an inch in the pivotal perforations of the targets would not make any appreciable difference in their alinement with said opening.

Underneath the opening 6 are arranged a series of ten sublevers 21, loosely mounted to vibrate freely on a rigid axis 22, fixed to the inside of the frame 2. These levers extend horizontally across the frame to bring their free ends under the axis 8 of the series of targets 10, and each lever is perforated adjacent the end, as at 23, to receive a wire link 24, that hooks through a perforation 25 in the extreme end of the ear 15 of each target. To vertically aline each lever with its associated target, a washer 26 separates the said levers on their axis 22, and the whole series of ten levers are held in position on said axis by a screw 27. Each lever is provided with an individual spring 28, that tends to raise the free end and assist the movement of the target in dropping to the opening 6.

Directly under the levers 21 are arranged a similar series of ten sublevers 29, loosely mounted on a fixed axis 30 under the free ends of the levers 21 and perforated at the ends, as at 31, to receive a link 32, that hooks through a perforation 33 in the ear 15 of the series of targets 9. A washer 34 separates these levers at their axis 30 to aline them with their respective targets 9 and are provided with an individual spring 35 like the upper series.

As the space between the sublevers 21 and 29 at their axis is limited to the space between two adjoining targets, an alternate long and short spring is used to stagger the hooked end that passes under the lower edge of each lever to avoid interference when said levers are vibrated. As previously described, the targets 9 and 10 are arranged to swing through vertical planes that are relatively different in each series, and as their respective sublevers 21 and 29 are alined to them vertically the link 32 from the lever 29 to its target 9 will pass between two adjoining levers 21 without interference.

Through the top of the horizontal portion 3 of the frame adjacent the front wall are formed three perforations or elongated slots 37, 38, and 39, that are suitably spaced relative to the width of the frame and each provided with two downwardly-extending guides 40, that are secured to the under side of the frame with screws 41. These guides are formed from sheet metal, and two guides between two adjoining slots may be formed integrally, as shown. Each guide has a U-shaped cross-section to register with the end of the slot and is formed with a spring member 42, normally pressing toward the opposite wall 43. This spring 42 is formed by slitting one side of the guide and permitting the side wall 43 and the end wall 44 to serve as guiding-faces alined to their respective slots.

45 represents ears arranged in pairs on the base-plate 4, and each pair are drilled to receive pivot-pins 47, 48, and 49. A series of seven retaining-levers 50 are mounted on the pin 47 between the two ears, a series of five retaining-levers 51 on the pin 48, and a series of six retaining-levers 52 on the pin 49. These retaining-levers are separated on their respective pivot-pins by washers 53, so that the washers and levers occupy the whole space between each pair of ears without unnecessary end motion. The levers 50 are banked together as a series to lie under the left-hand end of the slot 37, the levers 51 under the middle of the slot 38, and the levers 52 under the right-hand end of the slot 39, looking from the front of the casing. Each retaining-lever at the forward end has its upper edge bent over at right angles to form a horizontal face 54 to fill up the space between it and the adjoining lever caused by the washer 53. An individual spring 55 is provided each lever, which consists of a wire partially bent around the washer 53, with one end passing under the ledge 54 of the lever and the other end pressing against the base-plate 4, as shown in Fig. 2.

The series of retaining-levers 51 extend to the rear of the frame to a point under the sublevers 21 and 29 and lie practically in parallel planes; but the levers 50 and 52 at a point adjacent the rear of their pins 47 and 49 are bent inwardly and then rearwardly to gradually converge both series toward a central point on either side of the levers 51, where the rear ends of all three series normally lie in parallel planes and spring-pressed against the base-plate 4, as shown in Fig. 4. Each retaining-lever is provided with one or more small perforations 56, through which is knotted one end of a flexible cord 57, and the other end of said cord is knotted through one of three perforations 36, formed near the lower edge of each sublever 21 and 29 about midway of their length.

In all the various views the mechanism illustrated is adapted to a three-letter case, and each of the twenty targets 9 and 10 are illustrated with a different three-letter object. The objects illustrated on the series of targets 10, beginning from the front or the one nearest the opening 6, are "Dog," "Cow," "Fox," "Cap," "Hat," "Hay," "Bag," "Rug," "Hut," and "Dig." The objects illustrated on the targets 9, beginning from the front, are "Cat, Rat, Box, Mug, Boy, Cup, Hog, Bow, Fat, Hew." In these twenty words there are seven different first letters—namely, "B," "C," "D," "F," "H," "M," and "R"—five different middle letters, "A," "E," "I," "O," and "U," and six different end letters, "G," "P," "T," "X," "W," and "Y," making a total of eighteen different letters of the alphabet used in varying combinations to spell the names of the twenty objects illustrated on the targets 9 and 10.

Eighteen blocks 58, or one block for each of the letters found in the names of the twenty objects, are employed to coact with the eighteen retaining-levers 49, 50, and 51. These blocks are uniform in size and will interchange with either slot 37, 38, or 39 and when operative therein will project sufficiently above the frame 3 to expose the character on its face. Each block has a pin 59, that may be formed integrally with the block, as shown in Figs. 1 and 2, or may consist of a wire driven into the block, as shown in Fig. 6, and each pin is positioned differently relative to the other blocks. The width of the block is divided into eighteen divisions, as shown in Fig. 6, and each division represents the location and width of a pin 59. The first seven divisions give the location of each pin for the "B," "C," "D," "F," "H," "M," and "R" blocks, respectively, or the blocks used for the first letter of the twenty objects. The next six divisions are for the "A," "E," "I," "O," and "U" blocks, or the blocks used for the middle letters, and the last six divisions are for the "Y," "X," "W," "T," "P," and "G" blocks, respectively. The first seven blocks are operative within the slot 37, and the relative position of the seven retaining-levers 50 to the width of the slot 37 is the same as the relative position of the first seven pins 59 to the width of the block. Hence when one of the "B," "C," "D," "F," "H," "M," or "R" blocks are inserted within the slot 37 its pin 59 will register with the horizontal face or ledge 54 of one of the levers 50. The five blocks for the letters "A," "E," "I," "O," and "U" are operative within the slot 38, and their pins 59 will register with the five levers 51, and the last six blocks for the "Y," "X," "W," "T," "P," and "G" letters are operative within the slot 39, and their pins 59 will register with the six levers 52.

While the "B" block 58 is operative within the slot 37, if it were placed within the slot 38 its pin 59 is positioned too far to the left hand to strike any of the levers 51, but the lower edge of the block would strike the whole series of five retaining-levers and vibrate them as a series. To arrest this abnormal use of the block, a vertical post 60 is driven into the base-plate 4 under each slot 37, 38, and 39, with its upper free end about on a plane with the upper face or ledge of the retaining-levers, as shown in Figs. 1 and 4. These posts 60 also serve as stops to arrest the blocks when inserted within the proper slot to vibrate a lever and also arrest the insertion of an inverted block.

In the names of the twenty objects illustrated on the targets 9 and 10 the letter "B" is used four times—in "Bag," "Box," "Boy," and "Bow." Hence there will be four perforations 56 adjacent the rear end of the "B" retaining-lever 50. The "C" lever 50 will have four perforations, the "D" lever two, the "F" lever two, the "H" lever five, the "M" lever one, and the "R" lever two. The "A" lever 51 will have seven perforations 56, the "E" lever one, the "I" lever one, the "O" lever seven, and the "U" lever four. The "Y" lever 52 will have two, the "X" lever two, the "W" lever three, the "T" lever five, the "P" lever two, and the "G" lever six perforations.

As previously described, the sublevers 21 and 29 have a series of three perforations 36 or a total of sixty perforations for the twenty levers of both series, which is coincident with the sixty perforations 56 in the rear ends of the retaining-levers 50, 51, and 52. There will be sixty cords 57, or one cord connecting each perforation 56 with one of the perforations 36; but to avoid confusion only a few of these cords are shown in the drawings.

By referring more particularly to Figs. 2 and 3 it will be seen that the perforations 36 are practically in vertical alinement with their respective levers 50, 51, and 52, and the perforations 56 are alined as nearly as practicable with their respective sublevers 21 or 29.

From the first perforation 56 in the "D" lever 50 the cord 57 will connect with the sublever 21 through the perforation 36 nearest its axis. A second cord 57 will connect the first perforation 56 in the "O" lever 51 with the middle perforation 36, and a third cord will connect the first perforation in the "G" lever 52 with the last perforation 36 in the lever 21, that is linked to the "Dog" target 10. Similarly each one of the remaining nineteen sublevers 21 and 29 will have three cord connections—the first with a retaining-lever 50, the second with a lever 51, and the third with a lever 52.

A modified form of connection between the retaining-levers and sublevers is shown in Fig. 7, a wire link 57$^a$, having an eye 61 at one end to pass through the perforation 56 and an elongated eye 62, formed by bending the wire into a loop and then twisting the free end. To coact with these links 57$^a$ a transverse pin 63, formed with a head, is fixed to the sublevers 21 or 29 and the eye 62 of the link introduced around the pin 63 between its head and the lever to permit the link to have a free movement in two directions—up and down.

If the retaining-levers 50, 51, and 52 were all straight and arranged to extend rearwardly in parallel planes from their respective slots 37, 38, and 39, the cord 57 between a retaining-lever of the series 50, Fig. 1, would be tied to the sublever 21 adjacent its pivot 22, a lever of the series 52 would be tied to the extreme free end of the lever 21, while a lever of the series 51 would be tied to said lever 21 about central of its length and between the two other connections. As each series of retaining-levers 50, 51, and 52 have practically a uniform "dip" when vibrated by the blocks 58, the upward motion of their rear ends that are tied to the levers 21 and 29 will also be uniform. Hence when a lever 52 is vibrated the rear end will swing upwardly a distance equal to the motion of the free end of the lever 21 necessary to throw the target to the opening 6. The rear end of the lever 51 will rise a similar distance, and the lever 21 will rise in unison until the target strikes the shelf 18, which latter will take place before the lever 51 has completed its motion or before the block is arrested by the post 60, and as the motion of the lever 21 is less where it is connected to the lever 51 than where it is connected to the lever 52 when the lever 21 has thrown the target to the opening the superfluous motion of the lever 51 will only tend to loosen the cord 57, which while not objectionable in throwing the target to the opening represents a loss of motion that must be overcome when the block is removed from the slot 38 before the lever 51 will impart any motion to raise the target from the opening and cause it to disappear behind the frame. With the lever 50 this action would be greatly magnified, as the connection 57 is so near the pivot 22 of the lever 21 that the target would be thrown to the opening on the initial movement of the lever 50 when vibrated by the block; but the said lever 50 would not cause the target to disappear behind the frame until the extreme end of the return motion of said lever 50. Furthermore, if these retaining-levers were all straight a spring 55, that would return the lever 52 and its associated target to normal position when the block was removed, would be inoperative when applied to the lever 50 by reason of the cord connection so near the pivot 22, and were a stronger spring 55 introduced to return the target and hold the target from the opening when the other two levers 51 and 52 were vibrated the spring would also force the block out of the slot when the pressure of the finger was removed, unless the springs 42 were also greatly strengthened. By converging the rear ends of the retaining-levers 50, 51, and 52, as shown and described, the same spring tension may be used on all the levers. Hence the pressure required to insert a block through the slots is approximately the same, and the difference in motion between the three points of connection 36 is so slight that the insertion of the third block within a slot will instantly drop a target and cause it to instantly disappear when the block is withdrawn.

The springs 28 and 35 tend to raise the free ends of their respective levers 21 and 29, and the tension of the springs 55 is to normally hold said levers down against the springs 28 and 35.

While I have shown as the preferred construction the sublevers 21 and 29 with springs 28 and 35, respectively, each of said springs may be replaced by a spring 28$^a$, as shown in Fig. 9, that may be coiled around the axis of each target between the ears 15 and 16 and operate to throw the target to the opening when said target is released by the retaining-levers.

The back-plate 5 of the frame is provided with an opening 64, that is covered with a glass 65 and positioned to aline with the opening 6 in the front wall of the frame. With this construction, as shown in Fig. 2, light is able to penetrate within the casing from both front and rear. Hence the capacity of the casing as regards the number of targets that may be mounted upon a single axis is not limited to the penetration of light through a single opening in the front to illuminate the rearmost target. Each target may have the object illustrated upon both sides of the disk 13 and may be seen through either the front opening 6 or the rear opening 64 when released by the blocks.
To avoid confusion in describing and claiming the two systems of levers, I have termed the levers 50, 51, and 52 "retaining-levers," inasmuch as they normally hold and retain the targets from dropping to the opening 6 through their springs 55.
   Operation: The "D" block is inserted within the slot 37 with the character side to the front. In passing from the slot to the inside of the casing the block encounters the guides 40 on either end and the springs 42 on the rear side, requiring pressure to be applied to the block to force it through and by the said springs 42. The walls 43 and 44 of the guides 40 being rigid, the projecting pin 59 of the block will be guided in its downward course to strike the ledge 54 of the "D" lever 50 and pass between the two adjoining levers, causing the said "D" lever to vibrate on its axis 47 against the tension of its spring 55 to raise the rear end of said lever and relieve the tension on the two cords attached thereto, one cord communicating with the lever 21 linked to the "Dog" target and the other cord to the lever 21 linked to the "Dig" target. The downward movement of the block is arrested by its lower edge striking the post 60, and the frictional contact of the two springs 42 against the block is sufficient to hold the block within the slot and to resist the tendency of the spring 55 to force it upward out of the slot. The "O" block is inserted within the slot 38 and pressed through the guides 40. Its projecting pin 59 will line up with the ledge 54 of the "O" lever 51 and pass between the two adjoining levers. The insertion of the "O" block vibrates the "O" lever on its axis 48 and raises the rear end to loosen the seven cords 57 attached thereto and causes said cords to hang loosely from the levers 21 and 29 that are linked to the "Dog," "Cow," "Fox," "Box," "Hog," and "Bow" targets. The "G" block is inserted within the slot 39 and pressed through the guides 40. Its pin 59 will line up to strike the ledge 54 of the "G" lever 52 to vibrate it on its axis 49 and raise the rear end to loosen the six cords 57 attached thereto, permitting five of said cords to hang loosely from the sublevers linked to the "Rug," "Bag," "Dig," "Mug," and "Hog" targets. The sixth cord that connects with the lever 21 that is linked to the "Dog" target makes the third and last connection that holds the sublever down against its spring 28. Hence as the rear end of the "G" lever 52 rises from the base-plate 4 the spring 28 will cause the lever 21 to swing upwardly on its axis 22 in unison with the rear end of the lever 52. The free end of the lever 21 that is linked to the "Dog" target 10 will force the said target to swing downwardly on its axis 8 until the lower edge of the disk 13 strikes the shelf 18, which alines said target with the opening 6 and discloses the picture of a dog, as shown in Fig. 1, with the three blocks properly arranged within the slots to spell "Dog." The "D" block is now removed from the slot 37, and as the projecting pin 59 is withdrawn from contact with the "D" lever 50 the spring 55 will cause the rear end of said lever to drop until arrested by striking the base-plate 4. The cord 57, connecting said lever 50 with the sublever 21 that is linked to the "Dog" target, will pull the said lever 21 downwardly against the spring 28, and the link 24 will cause the "Dog" target to swing on its axis 8 from the opening 6 to its normal position behind the casing. If the "H" block is now inserted within the slot 37 and pressed through the guides 40, its projecting pin 59 will aline with the ledge 54 of the "H" lever 50 to vibrate it on its axis 47 and raise the rear end to loosen the five cords 57 attached thereto. With the "O" and "G" blocks positioned within the slots 38 and 39, as already for "Dog," the cords 57 from the "O" and "G" levers 51 and 52, respectively, are already loosened. Hence as the rear end of the "H" lever 50 rises from the base-plate 4 the sublever 29 that is linked to the "Hog" target will swing upwardly in unison and force the said target to swing to the opening 6, disclosing the picture of a hog. The "D" and "G" blocks are both removed from the slots and the hog has disappeared. The "C" block is inserted within the slot 37 and the "W" block within the slot 39, causing the "Cow" target to appear at the opening 6. With this latter combination when the "C" block is removed and the "Cow" target has disappeared if the "D" block is inserted within the slot 37 it simply vibrates its associated retaining-lever 50, but does not cause the appearance of a target at the opening because "D O W" is not included in any combination illustrated on the targets 9 or 10. If the "B" and "O" blocks were inserted within the slots 37 and 38, respectively, two of the cords 57 communicating to the sublever that is linked to the "Boy" target would be loosened; but the third cord attached to the "Y" lever 52 will still hold the said lever 21 and its associated "Boy" target in an inoperative position. Were it not for the upright post 60 under the slot 39 an inverted block placed within said slot and pressed downwardly would vibrate the whole series of six retaining-levers 52 and cause the "Boy" target to swing to the opening 6. Similarly if three inverted blocks were pressed through the three slots 37, 38, and 39, were it not for the said posts 60 under each slot the three series of retaining-levers would be vibrated simultaneously, causing all twenty targets to drop to the opening 6 and disclosing the first and last target to the front and rear openings, respectively. By using the proper combination of three blocks within the three slots 37, 38, and 39 any one of the twenty targets can be made to automatically appear at the opening 6 and then automatically disappear when the proper arrangement of the blocks is destroyed.

In the preferred form of my invention as already described each block 58 has a letter of the alphabet on its face to identify it as the proper block to use in combination with other blocks to disclose the picture of an object illustrated on a target. In Fig. 8 this arrangement is modified so that the object is illustrated on the three blocks 57ª in the same position or in different attitudes as shown or each illustration may be printed in a different color. The projecting member 59ª is positioned the same on all three blocks. Hence it is immaterial which one of the blocks of a series is placed within the slot 37 or 38 or 39, as each block pictured with the same object will operate in all three slots. Three series of twelve levers each, 50ª 51ª 52ª, are arranged under the slots 37, 38, and 39, respectively. Each series of levers is banked together to occupy the full width of the slot, but otherwise may be pivoted, spring-pressed, and converge toward the rear of the frame, as already described for the preferred construction. The first lever of each series will be tied to the same sublever 21, the second levers to the same sublever 29, and the third levers to the second sublever 21, &c. With this construction, having twelve levers duplicate themselves under each slot, the number of targets that may be used is limited, of course, to twelve. As shown in Fig. 8, the three "Cat" blocks 57ª are in operative position to vibrate the fourth lever of each series 50ª, 51ª, and 52ª. The rear ends are all corded to the same sublever 21, that is linked to the target 10ª, as shown in Fig. 9, having the three letters "C A T" printed on the disk. With this and the former description it will be understood that when the three "Cat" blocks are placed within the slots 37, 38, and 39 they will vibrate their respective retaining-levers to release the target, which informs the child how to spell the name of the picture on the blocks; also, that two "Cat" blocks and one "Dog" block used in the same combination will not release a target.

In Fig. 7 it is assumed that the "C," "A," and "G" blocks have been placed within the slots 37, 38, and 39, respectively, and the levers 50, 51, and 52 raised, as shown. The two links 57ª, attached to the "C" and "A" retaining-levers 50 and 51, have moved upwardly along the pins 63 without affecting the position of the sublever 29, that is still held down by the "T" retaining-lever and its link 57ª. When the "G" block is removed from the slot 39 and replaced by the "T" block, the "T" retaining-lever 52 and its link 57ª will move upwardly and permit the sublever 29 to vibrate under the influence of the spring to throw the "Cat" target to the opening 6.

Having now fully described the nature of my invention, I desire to secure the same by Letters Patent, and therefore claim—

1. In a kindergarten for teaching spelling, of a plurality of movable targets, a plurality of detached blocks, one of said elements having pictures and the other, letters which spell the pictures, and means connected to said targets and operated by said blocks.

2. In a kindergarten for teaching spelling, of a plurality of targets, a plurality of detached blocks, one element having pictures and the other, letters which spell the pictures, and means for operating each target individually through said blocks when they are properly arranged.

3. In a kindergarten for teaching spelling, of a pivoted target, a plurality of detached blocks, one element having a picture and the other, letters which spell the picture, and means for operating the target through said blocks when they are properly arranged.

4. In a kindergarten for teaching spelling, of a target, a plurality of detached blocks, one of said elements having a picture and the other, letters which spell the picture, and a plurality of levers for operating the target through said blocks when they are properly arranged.

5. The combination with a casing, of a pictured target that normally is hidden from view, and a plurality of detached devices, adapted when properly arranged, to expose the picture on the target.

6. The combination with a casing, of a plurality of pictured targets that normally are hidden from view, and a plurality of detached devices, adapted when properly arranged, to expose the picture on any desired target.

7. The combination with a casing, of a pictured target that normally is hidden from view, and a plurality of detached lettered blocks, adapted when properly arranged, to expose the picture on the target.

8. The combination with a casing, of a plurality of pictured targets that normally are hidden from view, and a plurality of detached lettered blocks, adapted when properly arranged, to expose the picture on any desired target.

9. The combination with a casing, of a target, a plurality of detached devices, adapted to expose the target when properly arranged, and means to cause the target to disappear when any one of said devices is removed.

10. The combination with a casing, of a plurality of pictured targets, a plurality of detached blocks, adapted to expose the picture on each target when properly arranged, and means to cause each picture to disappear when any one of said blocks is removed.

11. The combination with a casing, of a pictured target, a plurality of detached lettered blocks, adapted to expose the picture when arranged to spell the picture, and means to cause the picture to disappear when any one of said blocks is removed.

12. The combination with a casing, of a plurality of pictured targets, a plurality of detached lettered blocks, adapted to expose each picture when arranged to spell the picture, and means to cause each picture to disappear when any one of said blocks is removed.

13. The combination with a casing, of a pivoted target, a plurality of detached blocks, adapted to expose the target when properly arranged, and means to cause the target to disappear when any one of said blocks is removed.

14. The combination with a casing, of a pivoted pictured target, a plurality of detached lettered blocks, adapted to expose the picture when arranged to spell the picture, and means to cause the picture to disappear when any one of the blocks is removed.

15. The combination with a casing, of a plurality of pivoted pictured targets, a plurality of detached blocks, adapted to expose the picture on each target when properly arranged, and means to cause each target to disappear when any one of said blocks is removed.

16. The combination with a casing, of a plurality of pivoted pictured targets, a plurality of detached lettered blocks, adapted to expose each picture when arranged to spell the picture, and means to cause each picture to disappear when any one of said blocks is removed.

17. The combination with a casing, of one or more series of pictured targets, a plurality of detached blocks, adapted to expose each target when properly arranged, and means to cause each target to disappear when any one of said blocks is removed.

18. The combination with a casing, of one or more series of pictured targets, a plurality of detached lettered blocks, adapted to expose each picture when arranged to spell the picture, and means to cause each picture to disappear when any one of said blocks is removed.

19. In a kindergarten for teaching spelling, of one or more series of targets, a plurality of detached blocks, one element having pictures and the other, letters which spell the pictures, and means for operating each target individually through said blocks when they are properly arranged.

20. In a kindergarten for teaching spelling, of one or more series of targets, a plurality of detached blocks, one element having pictures and the other, letters which spell the pictures, and a plurality of levers for operating each target through said blocks when they are properly arranged.

21. The combination with a casing, of a target, a sublever connected to said target, a plurality of retaining-levers that are individually connected to said sublever, and detached blocks, adapted to vibrate said retaining-levers and move the target, when they are properly arranged.

22. The combination of a casing having an opening, of a movable target, a plurality of retaining-levers that individually hold the target away from said opening, a plurality of blocks to expose the target, and means to cause the target to disappear when any one of the said blocks is removed.

23. The combination with a casing, of a movable target, a sublever connected to said target, a plurality of retaining-levers connected to said sublever, a plurality of blocks to operate said retaining-levers to expose the target, and means to cause the target to disappear when any one of said blocks is removed.

24. The combination with a casing having a series of slots, of a movable target, a sublever connected to said target, a plurality of retaining-levers adjacent said slots, a plurality of detached blocks to operate said retaining-levers, and means intermediate said retaining-levers and sublever, that permit the vibration of one or more of the former, without vibrating the latter.

25. The combination of a movable target, a sublever connected to said target, a plurality of retaining-levers connected to said sublever, a plurality of detached blocks, and means integral with each block, to operate but one of said retaining-levers.

26. The combination with a plurality of movable targets, a sublever connected with each target, a plurality of retaining-levers connected to each sublever, and a plurality of detached blocks, each adapted to operate their associated retaining-lever.

27. The combination of a movable target, a sublever connected to said target, a plurality of retaining-levers connected to said sublever, a plurality of detached blocks, and a projecting member integral with each block, that is relatively different to the other blocks.

28. The combination of a movable target, a sublever connected to said target, a plurality of spring-pressed retaining-levers connected to said sublever, and a plurality of detached blocks to operate said retaining-levers and expose the target.

29. In a kindergarten for teaching spelling, of a target, detached blocks, one of said elements having a picture and the other, letters which spell the picture, a sublever connected to said target, and a plurality of retaining-levers connected to said sublever and operated by said blocks.

30. In a kindergarten for teaching spelling, of a target, a plurality of detached blocks, one element having a picture and the other, letters which spell the picture, a sublever connected to the target, and a plurality of retaining-levers, operated through said blocks when they are properly arranged.

31. In a kindergarten for teaching spelling, of a plurality of movable targets, a plurality of detached blocks, one of said elements having pictures and the other, letters which spell the pictures, a sublever connected with each target, and a plurality of retaining-levers connected with each sublever and operated by said blocks.

32. In a kindergarten for teaching spelling, of a plurality of movable targets, a plurality of detached blocks, one element having pictures and the other, letters which spell the pictures, a sublever connected to each target, and a plurality of retaining-levers connected with each sublever and operated through said blocks when they are properly arranged.

33. In a kindergarten for teaching spelling, of a plurality of pivoted targets, detached blocks, one of said elements having pictures and the other, letters which spell the pictures, a sublever connected with each target, and a plurality of retaining-levers connected to each sublever and operated by said blocks.

34. In a kindergarten for teaching spelling, of a plurality of movable targets, detached blocks, one element having pictures and the other, letters which spell the pictures, a sublever connected to each target, and a plurality of spring-pressed retaining-levers connected to each sublever and operated through said blocks when they are properly arranged.

35. In a kindergarten for teaching spelling, of a plurality of spring-pressed pivoted targets, detached blocks, one element having pictures and the other, letters which spell the pictures, a sublever connected to each target, and a plurality of retaining-levers connected to each sublever and operated by said blocks when they are properly arranged.

36. The combination with a casing, of a pictured target, a sublever linked to said target, a plurality of retaining-levers individually connected to said sublever, and detached lettered blocks adapted to vibrate said retaining-levers.

37. The combination with a casing, of a plurality of pictured targets, a sublever linked to each target, a plurality of retaining-levers connected to each sublever, and detached lettered blocks adapted to operate said retaining-levers.

38. The combination with a casing having a series of slots, of a plurality of targets, a plurality of levers banked together under each slot and connected with the targets, a plurality of blocks that are interchangeable within all the slots, and a projecting member on each block to operate but one lever under one of the slots.

39. The combination with a casing having a series of slots, of a plurality of targets, a plurality of spring-pressed levers arranged under each slot, a series of blocks interchangeable within all the slots, and means integral with each block to operate only its associated lever under one of the slots.

40. The combination of a casing having an opening, a pictured target normally hidden from view, a plurality of levers that individually hold the target away from the opening, and a plurality of detached lettered blocks adapted, when arranged to spell the picture, to collectively vibrate said levers and expose the target.

41. The combination of a casing having an opening, a plurality of pictured targets, each illustrated with the picture of a different object, a plurality of spring-pressed levers that individually hold one or more targets away from said opening, and a plurality of detached lettered blocks adapted, when arranged to spell a picture, to collectively vibrate said levers to operate the proper target.

42. In a kindergarten for teaching spelling, of a target, detached blocks, one of said elements having a picture and the other, letters which spell the picture, and a plurality of converging levers connected to said target and operated by said blocks.

43. In a kindergarten for teaching spelling, of a target, a plurality of detached blocks, one element having a picture and the other, letters which spell the picture, a sublever connected to said target, a plurality of retaining-levers individually connected to said sublever, and operated through said blocks when they are properly arranged.

44. In a kindergarten for teaching spelling, of a plurality of targets, a plurality of detached blocks, one element having pictures and the other, letters which spell the pictures, a sublever connected to each target, a plurality of retaining-levers connected to one or more subleves, and operated through said blocks when they are properly arranged.

45. The combination with a casing having an opening, of a plurality of pictured targets adapted to expose their pictures through said opening, a plurality of levers connected to said targets, a plurality of blocks to operate said levers, and means to arrest the movement of each target to aline it with said opening.

46. The combination with a casing having a series of slots, of a plurality of targets, a plurality of levers arranged under each slot, a plurality of blocks interchangeable in any slot, and means intermediate said slots and levers to hold each block within the slots.

47. The combination with a casing having a series of slots, of a plurality of targets, a plurality of levers arranged under each slot and connected to said targets, a plurality of blocks interchangeable in any slot, and a frictional device to hold said blocks within the slots.

48. The combination with a casing having a series of slots, of a plurality of targets, a plurality of levers arranged under each slot and connected to said targets, a plurality of blocks interchangeable in any slot, a projecting member on each block to operate said levers, and means to guide each block that its projecting member will register with its associated lever.

49. The combination with a casing having a series of slots, of a plurality of targets, a plurality of levers arranged under each slot and connected to said targets, a plurality of blocks interchangeable in any slot and adapted to vibrate said levers, and means to arrest the downward movement of the blocks within the slots.

50. The combination with a casing having a series of slots, of a plurality of targets, a plurality of levers arranged under each slot and connected to said targets, a plurality of blocks adapted to vibrate said levers, when inserted within said slots, and means to arrest the insertion of an inverted block within the slots to vibrate said levers.

51. The combination with a casing having a series of slots, of a plurality of targets, a series of levers arranged under each slot and each lever positioned differently relative to the width of the slots, a plurality of blocks interchangeable in any slot, and a projecting member on each block to register with its associated lever.

52. In a kindergarten for teaching spelling, of a movable target, detached blocks, one of said elements having a picture and the other, letters which spell the picture, a sublever connected to said target, a plurality of retaining-levers operated by said blocks, and means intermediate said retaining-levers and sublever, to permit of the vibration of one or more of said retaining-levers, without moving the target.

53. In a kindergarten for teaching spelling, of a movable target, detached blocks, one of said elements having a picture and the other, letters which spell the picture, a sublever connected to said target, a plurality of retaining-levers operated by said blocks, and a flexible connection between each retaining-lever and said sublever, to permit of the vibration of one or more of said retaining-levers, without vibrating said sublever and target.

54. In a kindergarten for teaching spelling, of a movable target, detached blocks, one element having a picture and the other, letters which spell the picture, a sublever connected to said target, a plurality of retaining-levers operated by said blocks, and a link connection between each retaining-lever and said sublever, to permit of the vibration of one or more of said retaining-levers, without vibrating said sublever.

55. The combination with a casing having a series of slots, of a movable target, a plurality of levers connected to said target and arranged adjacent said slots, a plurality of blocks interchangeable in any slot, and a projecting member on each block to vibrate but one of said levers.

In testimony whereof I have signed my name to this specification in the presence of two subscribing witnesses.

HERBERT H. STEELE.

Witnesses:
F. E. STEELE,
H. N. BUTTERWORTH.